(12) United States Patent
Maskrot (10) Patent No.: US 9,132,482 B2
(45) Date of Patent: Sep. 15, 2015

(54) METHOD FOR THE DRY GRANULATION OF NANOMETRIC PARTICLES

(75) Inventor: Hicham Maskrot, Montlhery (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 57 days.

(21) Appl. No.: 13/992,649

(22) PCT Filed: Dec. 9, 2011

(86) PCT No.: PCT/EP2011/072354
§ 371 (c)(1),
(2), (4) Date: Aug. 26, 2013

(87) PCT Pub. No.: WO2012/076698
PCT Pub. Date: Jun. 14, 2012

(65) Prior Publication Data
US 2013/0330557 A1  Dec. 12, 2013

(30) Foreign Application Priority Data

Dec. 10, 2010  (FR) ...................................... 10 60379

(51) Int. Cl.
| | |
|---|---|
| *B22F 9/04* | (2006.01) |
| *B01J 2/12* | (2006.01) |
| *C01B 33/113* | (2006.01) |
| *C01B 13/14* | (2006.01) |
| *C01B 31/30* | (2006.01) |
| *C01B 31/36* | (2006.01) |
| *C01G 23/047* | (2006.01) |

(52) U.S. Cl.
CPC ... *B22F 9/04* (2013.01); *B01J 2/12* (2013.01); *C01B 13/14* (2013.01); *C01B 31/30* (2013.01); *C01B 31/36* (2013.01); *C01B 33/113* (2013.01); *C01G 23/047* (2013.01); *Y10T 428/2982* (2015.01)

(58) Field of Classification Search
None
See application file for complete search history.

(56) References Cited

U.S. PATENT DOCUMENTS

| | | | | | |
|---|---|---|---|---|---|
| 3,210,772 | A | * | 10/1965 | Stirling | ......................... 425/217 |
| 3,299,132 | A | | 1/1967 | Dougherty | |
| 3,532,473 | A | * | 10/1970 | Biegler et al. | ............. 23/313 AS |
| 3,764,362 | A | * | 10/1973 | Hinley et al. | .................. 106/446 |
| 3,894,882 | A | * | 7/1975 | Takewell et al. | .............. 106/485 |

(Continued)

FOREIGN PATENT DOCUMENTS

| | | | |
|---|---|---|---|
| FR | 1 340 498 | A | 10/1963 |
| GB | 759 124 | A | 10/1956 |

OTHER PUBLICATIONS

International Search Report, PCT/EP2011/072354, dated Apr. 27, 2012.

(Continued)

*Primary Examiner* — Mary F Theisen
(74) *Attorney, Agent, or Firm* — Nixon Peabody LLP (57) ABSTRACT

A method of forming micrometric or millimetric sized granules by the agglomeration of nanometric sized particles, comprising the addition of a set of nanometric sized particles into a container having an inside wall surface with a circular or approximately circular section and setting the set of particles in motion along said inside wall surface by rotating the container about a rotation axis passing through said container. The setting in motion of the particles is done in a dry state and the container is rotated continuously at constant speed for several consecutive hours.

11 Claims, 4 Drawing Sheets

(56) References Cited

U.S. PATENT DOCUMENTS

| | | |
|---|---|---|
| 5,124,100 A | 6/1992 | Nishii et al. |
| 6,464,906 B1 * | 10/2002 | Niwa et al. .................. 264/7 |
| 2003/0003229 A1 * | 1/2003 | Walton ..................... 427/212 |

OTHER PUBLICATIONS

Chen, Y., et al. "Granulation of cohesive Geldart group C powders in a Mini-Glatt fluidized bed by pre-coating with nanoparticles," Powder Technology, vol. 191, Issues 1-2, Apr. 2009, pp. 206-217.

Faure, B., et al. "Spray drying of TiO2 nanoparticles into redispersible granules," Powder Technology, vol. 203, Issue 2, Nov. 2010, pp. 384-388.

Katzer, M., et al. "Residence Time Distribution in Granulation Drums on the Example of Industrial Carbon Black," Chemical Engineering & Technology, vol. 27, Issue 5, May 2004, pp. 578-582.

Moritz, T., et al. "Preparation of super soft granules from nanosized ceramic powders by spray freezing," Journal of Nanoparticle Research, vol. 4, Issue 5, Oct. 2002, pp. 439-448.

Nyberg, B., et al. "Granulation of Ceramic Powders for Pressing by Spray-Freezing and Freeze-Drying," Euro-Ceramics II, vol. 1, 1993, pp. 447-451.

Saederup Lindelov, J., et al. "Spray Drying for Processing of Nanomaterials," Journal of Physics: Conference Series, vol. 170, No. 1, 2009.

Watano, S., et al. "Microgranulation of fine powders by a novel rotating fluidized bed granulator," Powder Technology, vol. 131, 2003, pp. 250-255.

* cited by examiner

METHOD FOR THE DRY GRANULATION OF NANOMETRIC PARTICLES

CROSS REFERENCE TO RELATED APPLICATIONS or PRIORITY CLAIM

This application is a National Phase of PCT/EP2011/072354, filed Dec. 9, 2011, entitled, "METHOD FOR THE DRY GRANULATION OF NANOMETRIC PARTICLES", which claims the benefit of French Patent Application No. 10 60379, filed Dec. 10, 2010, the contents of which are incorporated herein by reference in their entirety.

TECHNICAL FIELD

This invention relates to inorganic powders of nanometric sized particles and their packaging in the form of micrometric or millimetric inorganic granules.

In the remainder of this description, the term nanoparticle is used to denote a nanometric-sized particle and nanopowder to denote a powder composed of nanoparticles.

STATE OF PRIOR ART

Nanoparticles have been becoming increasingly popular over the last several years due to their special properties. Nanoparticles are used as a raw material or as a finished material in various industries such as aeronautics (as nanocomposites), automobile (for manufacturing of tyres, paints and catalysts), energy (nuclear, photovoltaic, petrochemicals), cosmetics (as a structural agent or UV barrier), microelectronics (component, tool) and in food processing.

However, nanoparticles also have many disadvantages.

One of these disadvantages is that nanoparticles have the property of spontaneously occupying all available space. Therefore, they tend to be put in suspension instantaneously in air and consequently can be easily airborne towards entry pathways into the human body (nose, mouth, ears, etc.).

On the other hand, but not contradictorily, some nanopowders tend to agglomerate spontaneously due to their high surface energy. This particular spontaneous agglomeration state results in the powder having very poor flowability.

Secondly, nanopowders have to be stored very carefully to prevent risks of explosion, which are always present due to the high surface reactivity of nanoparticles.

Nanoparticles must be packaged once they have been produced for all these reasons (manipulation, storage and safety).

There are two main methods of packaging nanoparticles:

packaging of nanoparticles in the liquid phase, which consists of putting nanoparticles into suspension in various natures of solutions (water, alcohol, solvent, polymers), chosen as a function of subsequent transformations to be applied to nanoparticles; and granulation of nanoparticles, which consists of forming micrometric sized granules by agglomerating nanoparticles to each other.

Packaging of nanopowders in the form of a suspension is attractive, but it is not suitable for all manufacturers. Indeed, in some material production processes, materials have to be added dry.

Furthermore, creating a suspension requires larger masses of products to be stored and transported.

Finally, some nanopowders for example such as carbide powders, can react in time with aqueous or alcoholic solvents.

Therefore, it is usually preferred to condition nanopowders by granulating them.

Granulation may be done either dry or wet.

With dry granulation, granules are obtained without using any humectants (liquid or vapour).

Known dry granulation methods are all based on the principle of compaction/crushing of nanoparticles (document [1]) or at least on the principle of pre-compaction of nanoparticles (document [2]). Therefore, these methods require the use of specially designed parts to resist the different mechanical loads applied during the granulation step.

The mechanical strength of granules is achieved by the combined effect of the reduction in spacing between particles and the increase in their contact surface area caused by compaction or pre-compaction.

With wet granulation, granules are obtained by adding a humectant (liquid or vapour) to the particles, which acts as a binder and creates bonds between the particles.

There are several methods of wet granulation.

Granulation methods by mixing consist of mixing a nanopowder with a liquid. These methods are not frequently used, because intermediate products then have to be dried; this step is long and usually results in products with an excessive residual humidity.

Furthermore, the granules obtained are often too hard and their size and composition is too heterogeneous.

Finally, the solvents and organic binders used may be retained in the composition of the granules. Therefore the composition of the granules is not pure.

At the present time, the most frequently used granulation methods are spray drying (documents [3] and [4]), and freeze drying (documents [5] and [6]) and fluidised bed granulation (documents [7] and [8]).

However, these three granulation methods have the disadvantage that they are complex to apply.

This complexity of use is firstly related to management of solvents and gases that must be used, either at very low temperatures (liquid nitrogen at 50° K.), or very high temperatures (from 100 to 250° C.).

Furthermore, these granulation methods all include a step to put nanoparticles into suspension in a liquid solvent, possibly containing one or several organic binders.

The result is that all the granules thus obtained have a non-negligible residual content of solvent.

Furthermore, due to this residual solvent content, the granules obtained do not always have appropriate mechanical properties; they are either too friable to be manipulated, or too hard due to capillarity forces induced by the presence of residual liquid.

Considering the disadvantages of granulation methods according to prior art, the aim of the inventor was to design a granulation method that is easy to implement and can be used to make micrometric or millimetric sized particles.

PRESENTATION OF THE INVENTION

This purpose is achieved by means of a method of forming micrometric or millimetric sized inorganic granules by the agglomeration of nanometric sized inorganic particles, comprising the addition of a set of nanometric sized inorganic particles into a container having an inside wall surface of circular or approximately circular shape and setting the set of particles in motion along said inside wall surface by rotating the container about a rotation axis passing through said container, characterised in that the setting in motion of the particles is done in a dry state and the container is rotated continuously at constant speed for several consecutive hours.

Granulation in the granulation method according to the invention is done in a dry state, in other words the change from the particle state to the granule state is made without the addition of any humectant (liquid or vapour) or any other organic binder.

When the container is rotated, the particles move relative to the inside wall surface of the container and "roll" on this wall.

The ideal rotation speed of the container will be such that particles roll satisfactorily on the inside surface of the container wall.

Note that if all particles are to move along the inside surface of the container wall, the container must obviously be rotated, as those skilled in the art know, but like in the case of wet granulation, the rotation speed must also be less than a critical speed (that will be discussed further later on in the description); this critical speed often depends on the nature of the particles added into the container (their composition) and therefore must be determined experimentally.

Above this critical speed, the centrifugal force acting on the particles is too high for the particles to be able to move along the inside wall surface.

Preferably, a speed within the range slightly below this critical speed will also be avoided (speed range that those skilled in the art will be able to determine); at these rotation speeds, the particles will move along the inside wall surface, but will not necessarily form a "set", because several particles then tend to detach from the set and then to drop, thus scattering the other particles and thus disturbing the movement of the set of particles.

Preferably, the container rotation speed is chosen such that the set of particles moves by spreading along the inside surface of the container wall compared with the form that the set of particles has taken when stopped.

Preferably, the rotation speed is chosen such that the set of particles spreads along the inside surface of the container wall, and so that friction forces between particles and the wall and with other particles and the force of gravity, are greater than the centrifugal force applied on the particles.

Advantageously, the container rotation speed is between 25 and 40% of a critical speed corresponding to the rotation speed at which the set of particles is no longer made to move along the inside wall surface, although the container is still rotating. At the critical speed, the set of particles will no longer slide on the inside surface of the container wall, but will rotate all together with it.

Note that in the previous description and the following description, the term "size" applied to particles refers to the largest dimension of these particles; the term "nanometric" applied to particles means that the size is less than 100 nanometers; the term "micrometric" applied to particles means that the size is between 1 micrometer and 1 millimeter (not inclusive); the term "millimetric" applied to particles means that the size is between 1 millimeter and 10 millimeters.

The following procedure can be used to determine the size of elementary particles (unprocessed powder). Firstly, the specific surface area of the particles (or granules) is measured using the BET (Brunauer, Emmet and Telier) method that gives the surface area/weight ratio (unit $m^2/g^{-1}$) of the particles. The density of powder particles is then measured using the helium pycnometry method that provides the particle weight per unit volume. The helium pycnometer determines the density of a divided or porous solid material using the very precise measurement of the volume of a sample with known mass. Finally, the average particle diameter is calculated assuming that each particle is spherical.

The particle size is preferably determined by scanning electron microscope (SEM) observations.

The container rotation axis is preferably located at the centre of the circular or approximately circular section of the inside wall surface.

The container chosen may be any container having a circular or approximately circular inside wall surface, provided that this inside wall surface is made of a material resistant to particle abrasion.

Advantageously, the container may thus be made of metal, glass, ceramic or polymer.

Advantageously, the container may be any container for which the inside volume is spherical or cylindrical in shape.

The container may be a glass round bottom flask of the type frequently used in chemical laboratories (for example a Quickfit™ flask) or a cylinder, for example a cylindrical can.

The container is preferably closed, thus preventing accidental escape of particles from the container, and is also preferably leak tight.

In various embodiments, the rotation axis of the container may be inclined from the horizontal. It may thus be inclined at an angle greater than 0 and less than or equal to 90° relative to the horizontal; the inclination angle is preferably less than or equal to 80°.

Note that the container may be rotated by any known technical means that can put an object into rotation about a rotation axis; for example, it may be a roll mixer on which the container is placed (the container then being cylindrical or spherical in shape), or a rotor fixed to the container, etc.

One of the advantages of the granulation method according to the invention is that it may be used in the devices that are usually used for wet granulation, for example such as rotating drum devices (granulation drum) or rotating plate devices (rotating dish).

In this case, care will preferably be taken to close off device inlets and outlets once the particles have been added into it. For example, for the rotating dish, a lid could be used above the dish to prevent particles from escaping.

Similarly, in the case of a rotating dish composed of a flat plate provided with a rim, the plate of the dish will be inclined relative to the vertical so that all particles can be set in motion on the rim, the rim in this case forming the inside wall surface with a circular or approximately circular section.

On the other hand, if the bottom of the dish is spherical in shape, then there will be no need to incline the dish.

Furthermore, as in wet granulation processes, it is important to avoid overfilling the container with particles. Preferably, the inside volume of the container is at least five times larger than the volume of all particles added into the container.

Advantageously, particles added into the container are made of an inorganic material.

Advantageously, the inorganic material may be an oxide, a metal or a carbide. The inorganic material may be a titanium oxide, a silicon oxide, an aluminium oxide, a silicon carbide or a titanium carbide.

The granulation method according to the invention can be used to obtain particularly interesting micrometric or millimetric sized granules.

Thus, the invention is also applicable to a micrometric or millimetric granule of an inorganic material, characterised in that it is composed solely of nanometric particles of this inorganic material, said particles being agglomerated to each other.

Advantageously, the inorganic material is an oxide, a metal or a carbide.

Advantageously, the inorganic material is a titanium oxide, a silicon oxide, an aluminium oxide, titanium carbide or silicon carbide (SiC). Preferably, the inorganic material is chosen from among titanium dioxide ($TiO_2$), silicon dioxide ($SiO_2$) or alumina ($Al_2O_3$).

Advantageously, the granule is spherical or approximately spherical and it has nanometric sized facets.

Advantageously, the bulk density of the granule is at least twice the bulk density of any one of the particles added into the container. The granulated powder obtained has a bulk density at least twice the bulk density of the initial ungranulated powder and preferably significantly more.

The method according to the invention can be used for granulation of inorganic nanopowders (oxide, metal and carbide) using a dry method without the addition of any binder, solvent (vapour or liquid) and without any compaction.

Furthermore, no external modification to the ambient temperature or pressure in the container is necessary.

The addition of a neutral gas or reagent into the container is also unnecessary.

Finally, there is no need for any moving stirring devices like those used in mixers-granulators with a high shear rate (balls, etc.).

The granulation method according to the invention can be used to obtain more or less spherical granules with nano-structured facets.

The characteristics of the granules obtained at the end of the method according to the invention depend essentially on applied granulation parameters, namely the physicochemical and structural characteristics of the initial nanopowder, the "powder volume/receptacle internal volume" ratio, the container rotation speed, the inside volume of the container, the type of material from which the container is made, the rotation time, the angle of inclination of the rotation axis and the technique used to rotate the container.

The granules have a more or less broad size dispersion depending on the applied granulation parameters, varying from a few tens of micrometers to several millimeters (up to 7 mm).

The bulk density of the granulated nanopowder is adjustable and it can be increased up to 15 times the initial bulk density.

The granulated nanopowder obtained keeps its specific surface area and the granules are easily dispersed in a solvent by sonication.

The flowability of the granulated nanopowder is such that it can be sieved without clogging the sieve.

Finally, the moisture content is not higher than the initial moisture content of the unprocessed nanopowder.

The simplicity of the granulation method according to the invention makes it possible to envisage fast industrialisation and implementation of this method at low cost compared with other methods conventionally used in the nanopowders field.

Tests on shaping of solid materials from these granules are currently being carried out. Preliminary results show a significant improvement in ease of manipulation, a reduction in the storage volume and simplification of the material shaping protocol.

As we have just seen, application of the granulation method according to the invention is very easy, but it would be misleading to think that the method was obvious to those skilled in the art.

As we have mentioned above, nanopowders naturally tend to agglomerate. This is why the inventor makes a distinction for the purposes of the invention between a spontaneous nanopowder agglomeration state (spontaneous granulation) and an induced granulation state. It is important to make this distinction because by definition a granule is an agglomerate. As mentioned above, nanopowders are naturally in the form of agglomerates. However, granules or agglomerates resulting from spontaneous granulation remain powdery and volatile. The granules obtained by the granulation method according to the invention are micrometric or millimetric sized objects, preferably with spherical contours and shapes.

Although nanopowders naturally tend to agglomerate, at the same time they tend to occupy the entire available space. It is known that nanopowders tend to behave like a gas with regard to temperature. In other words, thermal motion tends to make nanopowder grains occupy an entire given volume.

Thus, it was not obvious to think that rotation of a nanopowder in a container could densify spontaneously formed pre-agglomerates and even less obvious to think that it could increase their size so as to form granules with a size of several micrometers.

Nanopowders usually have a very low bulk density; this bulk density for most nanopowders is less than 100 g/l (namely 0.1 $g/cm^3$). For example, titanium oxide $TiO_2$ reference P25 made by the Degussa Company is a very widely used reference nanopowder in the nanosciences field, and has a bulk density of 0.09 $g/cm^3$.

In addition to a low bulk density, attraction forces between nanopowder particles are such that setting in motion a mass of powder (in other words a set of particles) is difficult.

Furthermore, the low mass of elementary particles means that they only have a low kinetic energy. However, kinetic energy is necessary to bring the particles close together and to assure that there are enough effective particle collisions to assure that they agglomerate.

In summary, although particles tend to spontaneously agglomerate, other physical phenomena are involved as explained above. This is why those skilled in the art have never thought that a simple movement of the particles by rotating a bed of nanopowders could cause their granulation.

On the contrary, the nanosciences community has been attempting to develop more or less complex methods for granulating nanopowders for a long time, without ever envisaging the solution described herein.

The invention will be better understood after reading the following description relating to examples of making granules according to the invention and a comparison of these granules with equivalent off-the-shelf granules.

Obviously, these examples are only given as illustrations of the subject of the invention and are in no way limitative to this subject.

DETAILED PRESENTATION OF PARTICULAR EMBODIMENTS

The extremely poor amount of literature on granulation of inorganic nanopowders demonstrates the difficulty in conditioning them in the form of granules.

There are very few examples of granulation of oxide nanopowders ($TiO_2$, $SiO_2$ and $Al_2O_3$) and to our knowledge, there has been no successful granulation of a carbide from a silicon carbide type nanopowder (other than by compaction-crushing).

We will now describe a few granulation examples and compare them with the very few nanopowder granules found in the literature, to put this invention into its context.

Powders chosen to make this comparison are powder of P25 titanium oxide nanoparticles supplied by Degussa and powder of silicon carbide nanoparticles synthesised using a physical method (laser pyrolysis).

No comparison can be made for silicon carbide because there are no examples of micrometric or millimetric sized granules in the state of the art.

A. Granulation of P25 Titanium Oxide

P25 titanium oxide powder is a powder composed of nanometric sized titanium oxide particles, these particles having a specific surface area of 50 $m^2/g$ (+/−15), an average diameter of 21 nm and a bulk density of between 0.09 and 0.11 $g/cm^3$.

We found two studies in prior art illustrating two different techniques for granulation of this P25 titanium oxide powder, namely spray drying granulation in the study by Faure et al. (document [4]) and in the study by Moritz et al. (document [6]) and spray freezing granulation in the study by Moritz et al. (document [6]).

Faure et al. granulated this nanopowder, beginning by preparing a suspension of $TiO_2$ nanopowder in water using a large quantity of dispersant (for example Dispex N40). The proportions used are 240 g of dispersant (dry mass) for 10 kg of $TiO_2$ powder in 18 liters of water.

A sieving step of the suspension thus obtained is necessary to eliminate large agglomerations that can block the spray nozzle.

The sieved suspension is then stirred continuously until it is added into a spray nozzle-dryer device.

Under these conditions, Faure et al. obtain spherical granules with a large size dispersion (from 11 to 87 μm) and an average diameter (D50) of 33 μm.

The residual moisture content in these granules is 2.5%.

The density of the nanopowder after granulation has increased from 0.11 $g/cm^3$ to 0.69 $g/cm^3$.

The granules obtained are easily redispersed in suspension by ultrasonication.

Almost all the organic dispersant (Dispex 40) remains in the granules. Therefore, it can be concluded that the dispersant also acts as an organic binder, which on the other hand means that without a binder, granulation would probably not have taken place.

Moritz et al. worked on granulation by freeze drying and by spray drying.

They work with suspensions with different contents by mass of powders (from 25 to 45% by mass).

In some cases, they add 4% by mass of dispersant into the suspensions.

Moritz et al. obtain more or less compact spherical granules with both techniques.

Using the freeze drying granulation method without a dispersant, they obtain a granulated nanopowder with a density varying from 0.18 to 0.3 $g/cm^3$.

The addition of a dispersant (which also acts as a binder in the dry phase) can increase this density up to 0.44 $g/cm^3$.

The density of granulated nanopowders obtained by spray drying (with binder) which is equal to 0.75 $g/cm^3$ is greater than the density of nanopowders obtained using the freeze drying granulation method.

The spherical granules obtained by spray drying appear to be more compact and have a smoother surface than those obtained by freeze drying. According to Moritz et al., this is explained by the fact that spray drying encourages the appearance of capillarity forces during evaporation of the liquid. According to them, these forces make the granules more cohesive. In the case of freeze drying, these forces do not occur and only small physical forces like London/Van-der-Waals type forces enable cohesion of the granules.

We used the same commercial powder, namely P25 titanium oxide powder, to demonstrate the efficiency of the method according to the invention.

Example a1

Figure 1:
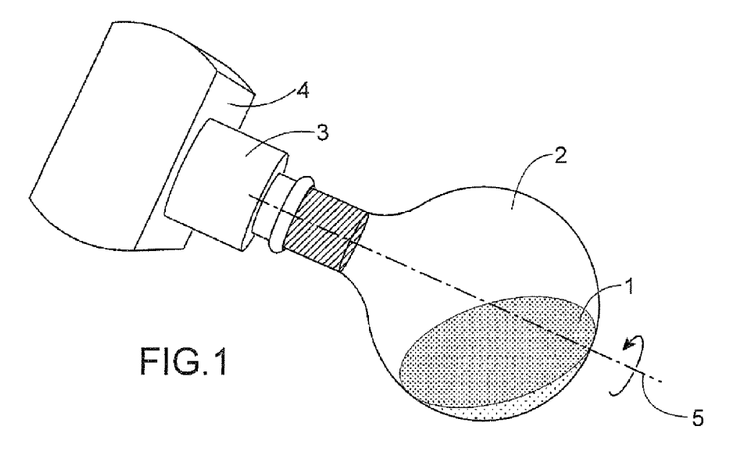
FIG. 1 diagrammatically shows a first example of the device that can be used for granulation according to the invention.

The device used for granulation in this example embodiment of the invention is shown diagrammatically in FIG. 1.

This device is composed of a stator 4 (fixed (static) part of an electric motor) and a rotor 3 (mobile part of the electric motor). The container 2 in this case is a glass round bottom flask. The flask is fixed to the end of the rotor 3 and rotates about a rotation axis 5.

The quantity of titanium oxide nanopowder P25 added into the glass flask is calculated such that the nanopowder occupies about 25% of the inside volume of the flask. The rotor rotates the flask about a rotation axis.

The rotation axis of the rotor may be inclined by an angle varying up to 90° (inclusive) from the horizontal (in FIG. 1, the flask is facing directly downwards).

In our example embodiment, the inside volume of the glass flask used is 2 liters, its inside diameter is about 10 cm, and its rotation speed in usage mode is 50 revolutions per minute.

The powder mass added into the flask is 50 g.

The flask rotation time is fixed at 6 hours.

The walls of the flask cause the nanopowder bed to move.

Figure 2A:
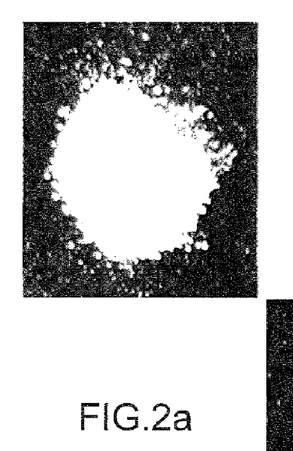
FIGS. 2a to 2c are photographs obtained using a conventional camera that show a pile of 100 mg of the raw powder (FIG. 2a) used in a first example embodiment of the method according to the invention and granules obtained after 6 hours rotation (FIGS. 2b and 2c) in the granulation device shown in FIG. 1.
Figure 2B:
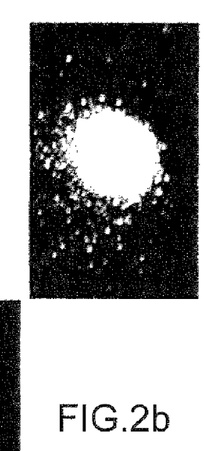
Figure 2C:
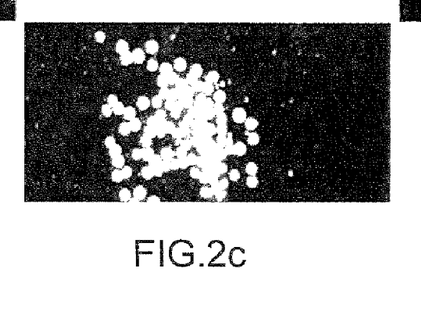

FIGS. 2a to 2c are three photographs showing respectively the raw powder (FIG. 2a) and the granules obtained after 6 hours rotation in the granulation device described above (FIGS. 2b and 2c).

For the granulated powder, two different granule populations can be distinguished with the naked eye: "large" granules (FIG. 2c), that account for about 10% of the entire mass of the granulated powder obtained, and "small" granules (FIG. 2b), that represent the remaining nanopowder obtained, namely about 90% by mass of the granulated powder obtained.

The two populations can be separated by sieve.

An increase in the granulation time (in other words the glass flask rotation time) can reduce the number of "large" granules.

Figure 3A:
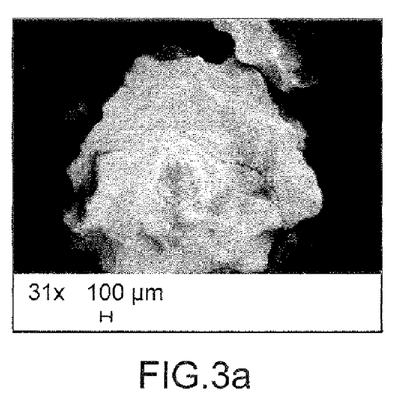
FIGS. 3a and 3b show pictures obtained by scanning electron microscopy (SEM) of granules obtained after 6 h according to a first example embodiment.
Figure 3B:
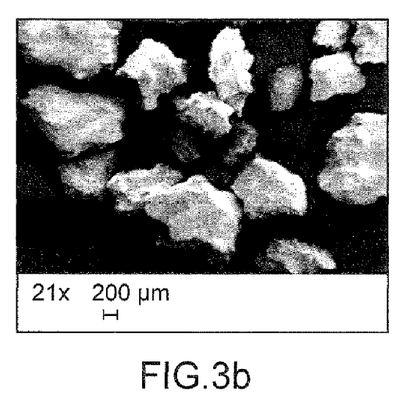

FIGS. 3a and 3b show pictures of granules obtained after 6 h observed in scanning electron microscopy (SEM).

The picture shown in FIG. 3a is a picture of a large granule. It shows an approximately spherical shaped granule with a diameter of about 2.7 mm, with an irregular surface with a crack at its centre.

This crack is the result of the granule formation mechanism. The formation of very large and very different sized granules (with a diameter of up to 1 cm) is observed at the beginning of granulation (first hour), and then the granules break throughout the process under the effect of repeated shocks. These shocks densify the granules.

The picture in FIG. 3b shows small granules (90% by mass of the granulated powder). It can be seen that the size distribution of the small granules ranges from 600 μm to 1.2 mm. Furthermore, while the "large" granules are generally spherical in shape, the "small" granules are more irregular.

Example a2

Figure 4:
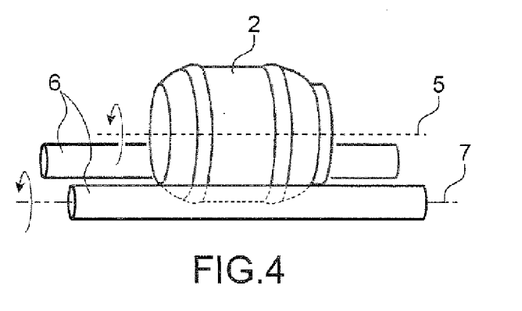
FIG. 4 diagrammatically shows a second example of a device that can be used for granulation according to the invention.

The granulation device used for this embodiment is different from that used in the previous example; it is shown in FIG. 4.

As can be seen, we used a simple cylindrical shaped can as a container 2, in this case a sealed high density polyethylene can made by Curtec™

Its volume is 5 liters and the mass of the nanopowder added into it is 200 g (not shown).

The can is placed on two rubber coated rollers 6. One of the rollers is the drive roller and it rotates about its rotation axis 7, while the other turns freely. The drive roller will rotate the can, which will rotate about the rotation axis 5, and the can will in turn rotate the other roller 6.

The rotation speed of the drive roller is set to 60 revolutions per minute.

During a first experiment, we continued the experiment for 12 hours stopping the rotation of the can once every hour to observe the condition of the powder. We observed that stopping the can rotation once every hour and then opening the can to observe the powder had a negative effect on the granulation, even after twelve 1-hour cycles. Although the density of the powder relative to that of the initial powder has doubled after 12 hours, it was still impossible to observe granules according to the definition of the invention. The powder obtained is very cohesive (very poor flowability) and powdery, namely a state similar to the raw powder.

We carried out four identical experiments, changing only the granulation times. Granulation times were fixed at 4, 24, 48 and 72 hours respectively.

If rotation is not interrupted, then the granulation state obtained after 4 h is similar to the granulation state observed in the first granulation method without the large granules.

Figure 5A:
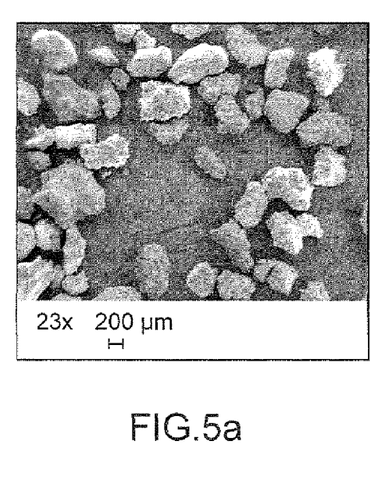
FIGS. 5a to 5c show pictures of granules observed in scanning electron microscopy for different granulation times according to a second example embodiment of the method according to the invention.
Figure 5B:
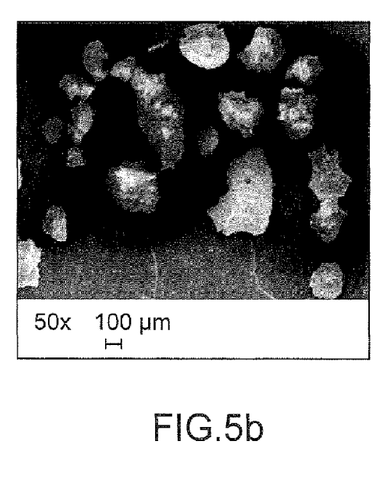
Figure 5C:
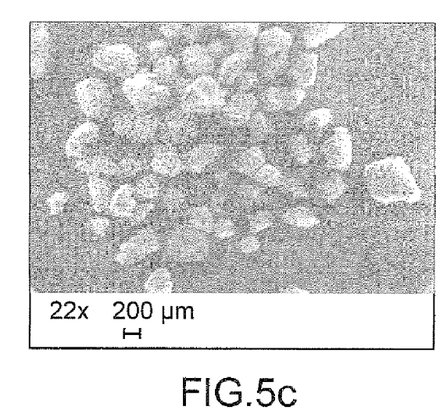

FIGS. 5a to 5c show pictures of granules observed in scanning electron microscopy (SEM) with low magnification obtained after different granulation times, namely after 24 hours (FIG. 5a; magnification 23 times), after 48 hours (FIG. 5b; magnification 50 times) and after 72 hours (FIG. 5c; magnification 22 times).

Firstly, it is observed that the shape of the granules is similar to the shape obtained with the first embodiment (as described in example A1).

However, it is observed that granule surfaces are rougher and that they have sharper edges.

A reduction in the size of the granules is also observed, with a refinement of the granule size distribution as a function of the rotation time. The granule size distribution ranges from 300 μm to 1 mm, from 100 μm to 700 μm and from 200 μm to 500 μm for granulation times of 24, 48 and 72 hours respectively.

We took SEM pictures at two different magnifications (×200 (FIG. 6a) and ×50000 (FIG. 6b)) of a granule obtained using the method according to the invention after 4 hours.

Figure 6A:
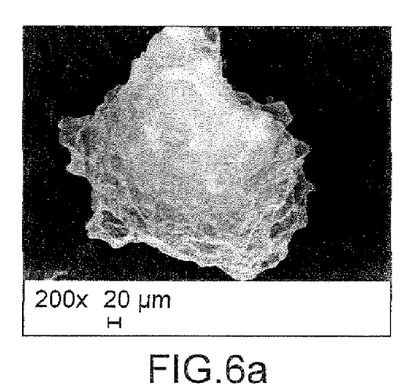
FIGS. 6a and 6b show pictures of a granule obtained after 4 hours according to the second example embodiment of the method according to the invention and observed in scanning electron microscopy at two different magnifications.

After 4 hours, we obtained dispersed and non-agglomerated granules with a size of several micrometers, or even several hundred micrometers. FIG. 6a shows an SEM picture of one of these micrometric sized granules.

Figure 6B:
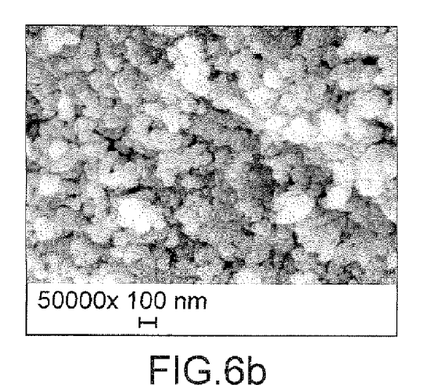

Looking in more detail, this granule is seen to be composed of nanometric-sized agglomerated grains.

These two SEM pictures also show that there is a two-level organisation within granules obtained according to the invention.

The following table shows bulk densities obtained after different granulation times at constant velocity, in other words at time 0 and after a granulation time of 4, 30 and 72 hours respectively.

|  | Granulation time (hours) | | | |
| --- | --- | --- | --- | --- |
|  | 0 | 4 | 30 | 72 |
| Bulk density (g/cm$^3$) | .09 | .4 | .6 | .75 |

It can be seen that the density increases as the granulation time increases.

The value of 0.75 g/cm$^3$ obtained after 72 hours is equivalent to the value obtained by Moritz et al. during granulation by spray drying of P25 TiO$_2$ nanopowder with binder.

B. Granulation of Nanometric Sized Silicon Carbide SiC Particles

Prior art does not describe granulation of carbide nanopowders, and certainly not silicon carbide nanopowders. This is why it was impossible to compare results obtained using the method according to the invention and results according to prior art.

The device used for granulation of SiC is similar to the device used in example A2 described above.

Therefore we used a sealed high density polyethylene can made by Curtec™ with a volume of 5 liters and we added 200 g of nanometric sized silicon carbide powder synthesised by laser pyrolysis.

The specific surface area of the powder is 61 m$^2$/g and the bulk density is 45 g/l (namely 0.045 g/cm$^3$).

The can is placed on two rubber-coated rollers, one of which is a drive roller and rotates the can, and the other rotates freely. The rotation speed of the drive roller is set to 60 revolutions per minute.

The granulations times were fixed at 6, 22, 72, 100, 120 and 132 hours respectively.

As for titanium oxide, we observed that stopping the can rotation and opening the can to observe the powder once every hour has a negative effect on granulation, even after 12 h.

Granules as defined according to the invention could not be observed, even though the density of the powder had doubled. The powder obtained was still very cohesive (very poor flowability) and powdery, in a state similar to that of the raw powder.

On the other hand, a satisfactory granulation state is observed after 4 h if rotation is not interrupted.

Figure 7A:
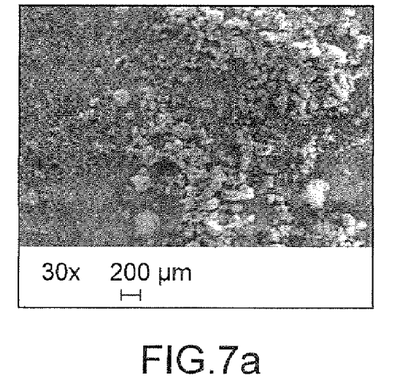
FIGS. 7a to 7c show pictures observed in scanning electron microscopy of the raw powder and granules obtained according to the second embodiment using the method according to the invention after 22 hours and 100 hours of granulation, respectively.
Figure 7B:
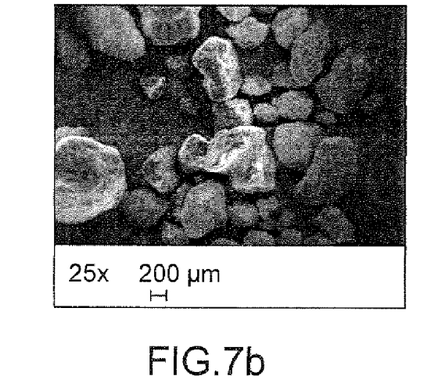
Figure 7C:
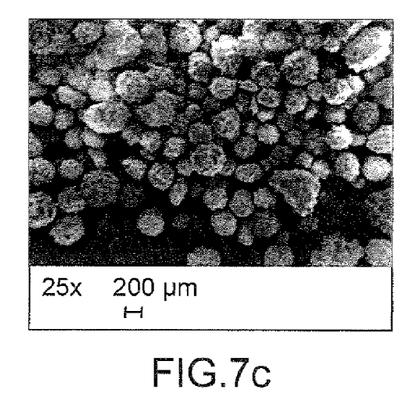

FIGS. 7a to 7c respectively show SEM pictures of the raw powder (FIG. 7a; magnification×30) and granules obtained by the method according to the invention after 22 hours (FIG. 7b; magnification×25) and after 100 hours granulation (FIG. 7c; magnification×25).

Starting from the picture shown in FIG. 7a, it can be seen that the raw powder is in a typical nanopowder agglomeration, namely a very broad size distribution of agglomerates (typically varying from a few hundred nanometers to 300 micrometers), an undefined shape of agglomerates, the presence of large quantities of agglomerates smaller than 1 micrometer, a very low density (less than 0.045 g/cm$^3$), etc.

Concerning granulated powders obtained by the method according to the invention after 22 hours and 100 hours of granulation, a reduction in the granule size is observed together with a refinement of the granule size distribution as the rotation time increases.

The size distribution of granules varies from 200 μm to 1.1 mm and from 100 μm to 700 μm, for granulation times between 22 hours and 100 hours respectively.

Figure 8A:
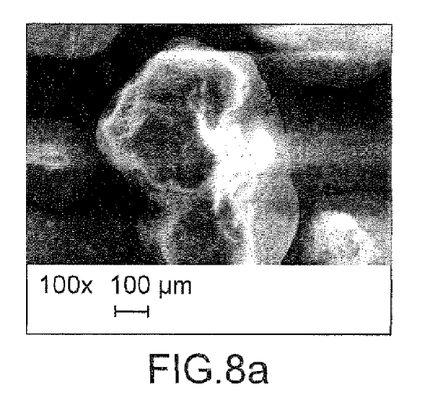
FIGS. 8a to 8c show pictures observed in scanning electron microscopy of granules obtained according to the second example embodiment using the method according to the invention after 22 hours, 100 hours and 120 hours, respectively.
Figure 8B:
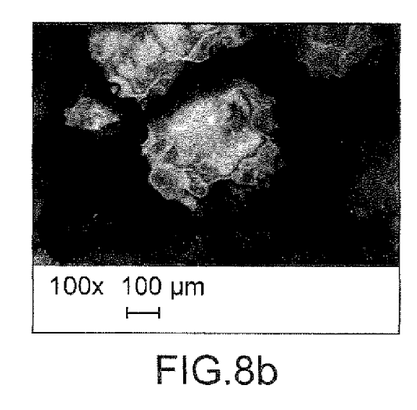
Figure 8C:
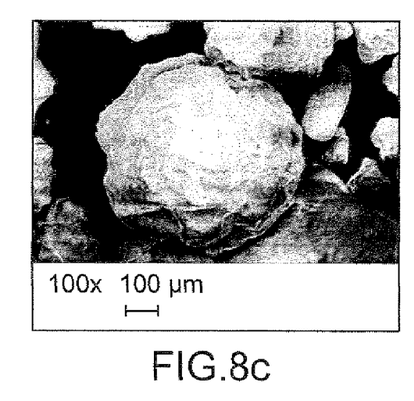

Furthermore, observation of SEM pictures of granules obtained using the method according to the invention after 22 hours (FIG. 8a; magnification×100), after 100 hours (FIG. 8b; magnification×100) and after 120 hours (FIG. 8c; magnification×100) of granulation demonstrate spheroidisation of granules as the granulation time increases.

The following table summarises bulk densities obtained after different granulation times at constant speed.

|  | Granulation time (hours) | | | | | | |
| --- | --- | --- | --- | --- | --- | --- | --- |
|  |  | 2 | 2 | 00 | 20 | 32 |
| Bulk density (g/cm$^3$) | .045 | .27 | .36 | .50 | .51 | .55 | .53 |

It can be seen that the bulk density of granules increases as the granulation time increases, to reach an optimum after 120 hours. A slight reduction in the density is observed after a duration of 132 hours.

Sieving tests showed that flowability of the powder of granules is good. No clogging was observed when using an 800 μm sieve.

Measurements before and after granulation demonstrated that there was no significant change in the specific surface area of granulated powders.

Powder samples are degassed while scavenging with nitrogen for 2 hours at 250° C. before the measurements are made.

Granulation was done with a device similar to that in example A1.

The specific surface area and the apparent moisture content corresponding to the loss of mass of powder after degassing at 250° C. are measured for each sample.

The results are summarised in the following table.

|  | Granulation time (hours) | | |
| --- | --- | --- | --- |
|  | 0 | 6 | 22 |
| Specific surface area (m$^2$/g) | 60 (+/−3) | 61 (+/−3) | 63 (+/−3) |
| Apparent moisture content | 2 | 0.8 | 0.5 |

It can be seen that the loss of powder mass reduces as the granulation time increases. Nevertheless, this final result can be criticised because the mass to be degassed increases if the volume, time and temperature remain constant, due to the increase in the bulk density.

BIBLIOGRAPHY

[1] U.S. Pat. No. 5,124,100
[2] Katzer et al.
"Residence time distribution in granulation drums on the example of industrial carbon black", Chem. Eng. Technol. (2004), 27, No. 5
[3] Saederup et al.
"Spray drying for processing of nanomaterials", Journal of Physics: Conference Series 170 (2009), International Conference on Safe production and use of nanomaterials
[4] Faure et al.
"Spray drying of TiO$_2$ nanoparticles into redispersible granules", Powder Technology (2010)
[5] Nyberg et al.
"Granulation of ceramic powders for pressing by spray freezing and freezing-drying", Euro-Ceramics II (1993), vol. 1, p 447-451
[6] Moritz et al.
"Preparation of super soft granules from nanosized ceramic powders by spray freezing", Journal of Nanoparticle Research 4 (2002), p 439-448
[7] Watano et al.
"Microgranulation of fine powders by a novel rotating fluidized bed granulator", Powder Technology 131 (2003), p 250-255
[8] Chen et al.
"Granulation of cohesive Geldart group C powders in a Mini-Glatt fluidized bed by pre-coating with nanoparticles" Powder Technology 191 (2009), p 206-217

The invention claimed is:

1. Method of forming micrometric or millimetric sized inorganic granules by agglomeration of nanometric sized inorganic particles, the method comprising addition of a set of nanometric sized inorganic particles into a container having an inside wall surface with a circular or approximately circular section and setting the set of particles in motion along said inside wall surface by rotating the container about a rotation axis passing through said container, wherein the setting in motion of the particles is done in a dry state and the container is rotated continuously at constant speed for several consecutive hours.

2. Method of forming granules according to claim 1, wherein the rotation axis of the container is located at the centre of the circular or approximately circular section of the inside wall surface.

3. Method of forming granules according to claim 1, wherein the container rotation speed is between 25 and 40% of a critical speed corresponding to a rotation speed at which the set of particles is no longer made to move along the inside wall surface, although the container is still rotating.

4. Method of forming granules according to claim 1, wherein the container is a closed container.

5. Method of forming granules according to claim 1, wherein the rotation axis of the container is inclined from horizontal.

6. Method of forming granules according to claim 1, wherein inside volume of the container is at least five times larger than the volume of the set of particles added into the container.

7. Method of forming granules according to claim 1, wherein inside volume of the container is spherical or cylindrical in shape.

8. Method of forming granules according to claim 1, wherein particles added into the container are made of an inorganic material.

9. Method of forming granules according to claim 8, wherein the inorganic material is an oxide, a metal or a carbide.

10. Method of forming granules according to claim 9, wherein the inorganic material is a titanium oxide, a silicon oxide, an aluminium oxide, a silicon carbide or a titanium carbide.

11. Method of forming granules according to claim 10, wherein the inorganic material is chosen from among titanium dioxide ($TiO_2$), silicon dioxide ($SiO_2$) or alumina ($Al_2O_3$).

\* \* \* \* \*